US 9,696,896 B2

(12) United States Patent
Dubey et al.

(10) Patent No.: US 9,696,896 B2
(45) Date of Patent: Jul. 4, 2017

(54) METHOD AND SYSTEM FOR VISUALIZING PATTERNS DURING INTERNET BROWSING

(75) Inventors: Sourabh Dubey, Karnataka (IN); Vineeth Nair, Karnataka (IN)

(73) Assignee: EXCALIBUR IP, LLC, Sunnyvale, CA (US)

( * ) Notice: Subject to any disclaimer, the term of this patent is extended or adjusted under 35 U.S.C. 154(b) by 430 days.

(21) Appl. No.: 13/543,868

(22) Filed: Jul. 8, 2012

(65) Prior Publication Data

US 2014/0013250 A1 Jan. 9, 2014

(51) Int. Cl.
| | |
|---|---|
| *G06F 3/0485* | (2013.01) |
| *G06F 17/30* | (2006.01) |
| *G06Q 30/02* | (2012.01) |
| *G06F 3/0481* | (2013.01) |
| *G06T 11/00* | (2006.01) |

(52) U.S. Cl.
CPC ........ *G06F 3/04855* (2013.01); *G06F 3/0485* (2013.01); *G06F 17/30899* (2013.01); *G06F 3/0481* (2013.01); *G06Q 30/02* (2013.01); *G06T 11/00* (2013.01)

(58) Field of Classification Search
CPC ............... G06F 3/04855; G06F 3/0481; G06F 17/30899; G06T 11/11; G06T 11/00; G06Q 30/02
USPC .......................... 715/760, 789, 973; 345/619
See application file for complete search history.

(56) References Cited

U.S. PATENT DOCUMENTS

| | | | |
|---|---|---|---|
| 8,379,053 B1 * | 2/2013 | Phillips et al. | 345/619 |
| 2002/0138486 A1 * | 9/2002 | Rishel | 707/10 |
| 2003/0231196 A1 * | 12/2003 | Keohane et al. | 345/700 |
| 2012/0303552 A1 * | 11/2012 | Zayas et al. | 705/400 |

FOREIGN PATENT DOCUMENTS

FI    WO 2011128514 A1 * 10/2011 ............. G06Q 30/02

* cited by examiner

*Primary Examiner* — Sherrod Keaton
*Assistant Examiner* — Mong-Shune Chung
(74) *Attorney, Agent, or Firm* — James J. DeCarlo; Greenburg Traurig (57) ABSTRACT

A computer-implemented method for visualizing patterns during internet browsing includes loading a web page in response to a user opening a browser. The web page includes web content. The computer-implemented method also includes initializing a marker corresponding to the web page, the marker implying beginning of a web session. Further, the computer-implemented method includes creating a visual pattern during the web session. The visual pattern includes the marker. Furthermore, the computer-implemented method includes terminating the marker implying end of the web session. Moreover, the computer-implemented method includes analyzing the visual pattern to infer a corresponding significance factor. The computer-implemented method includes performing appropriate actions on the web content based on the significance factor.

19 Claims, 8 Drawing Sheets

FIG. 5b(i)   FIG. 5b(ii)  FIG. 5b(iii)

FIG. 5d(iii)

METHOD AND SYSTEM FOR VISUALIZING PATTERNS DURING INTERNET BROWSING

TECHNICAL FIELD

Embodiments of the disclosure relate generally, to communications and more specifically, to visualize patterns during internet browsing.

BACKGROUND

Internet browsing across desired websites and web pages has become an essential activity for users. Moreover, engaging the users during internet browsing is a challenge. Various techniques to ensure that the users utilize web content efficiently, are improvised day-to-day. However, the techniques necessitate information related to the user's engagement with the web content.

Traditional quantitative metrics like page views, time spent and click-through-rate are applied to calculate the engagement of users with the web pages. However, such quantitative metrics do not provide enough information and insight about the user's engagement. Moreover, details of how the users interacted with the web content are overlooked. Consequently, various business users, for example editors, designers and advertisers are not empowered to take business decisions as information related to behavioral patterns of users are not evident.

In light of the foregoing discussion, there is a need for an efficient method and system for visualizing patterns during internet browsing.

SUMMARY

The above-mentioned needs are met by a computer-implemented method, computer program product, and system for visualizing patterns during internet browsing.

An example of a computer-implemented method for visualizing patterns during internet browsing includes loading a web page in response to a user opening a browser. The web page includes web content. The computer-implemented method also includes initializing a marker corresponding to the web page. The marker implies beginning of a web session. Further, the computer-implemented method includes creating a visual pattern during the web session. The visual pattern includes the marker. Furthermore, the computer-implemented method includes terminating the marker implying end of the web session. Moreover, the computer-implemented method includes analyzing the visual pattern to infer a corresponding significance factor. The computer-implemented method includes performing appropriate actions on the web content based on the significance factor.

An example of a computer program product stored on a non-transitory computer-readable medium that when executed by a processor, performs a method for visualizing patterns during internet browsing includes loading a web page in response to a user opening a browser. The web page includes web content. The computer program product includes initializing a marker corresponding to the web page, the marker implying beginning of a web session. The computer program product also includes creating a visual pattern during the web session. The visual pattern includes the marker. Further, the computer program product includes terminating the marker implying end of the web session. Moreover, the computer program product includes analyzing the visual pattern to infer a corresponding significance factor. The computer program product includes performing appropriate actions on the web content based on the significance factor.

An example of a system for visualizing patterns in internet browsing includes a web browser. The web browser loads one or more web pages to a user. The system also includes a visualizing module that creates a visual pattern during a web session. Further, the system includes an analyzing module that analyzes the visual pattern to obtain a corresponding significance factor. Furthermore, the system includes a notifying module that informs one or more applicants to perform appropriate actions on the web content based on the significance factor.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

A computer-implemented method, computer program product, and system for generating visualizing patterns during internet browsing are disclosed. The following detailed description is intended to provide example implementations to one of ordinary skill in the art, and is not intended to limit the invention to the explicit disclosure, as one of ordinary skill in the art will understand that variations can be substituted that are within the scope of the invention as described.

Figure 1:
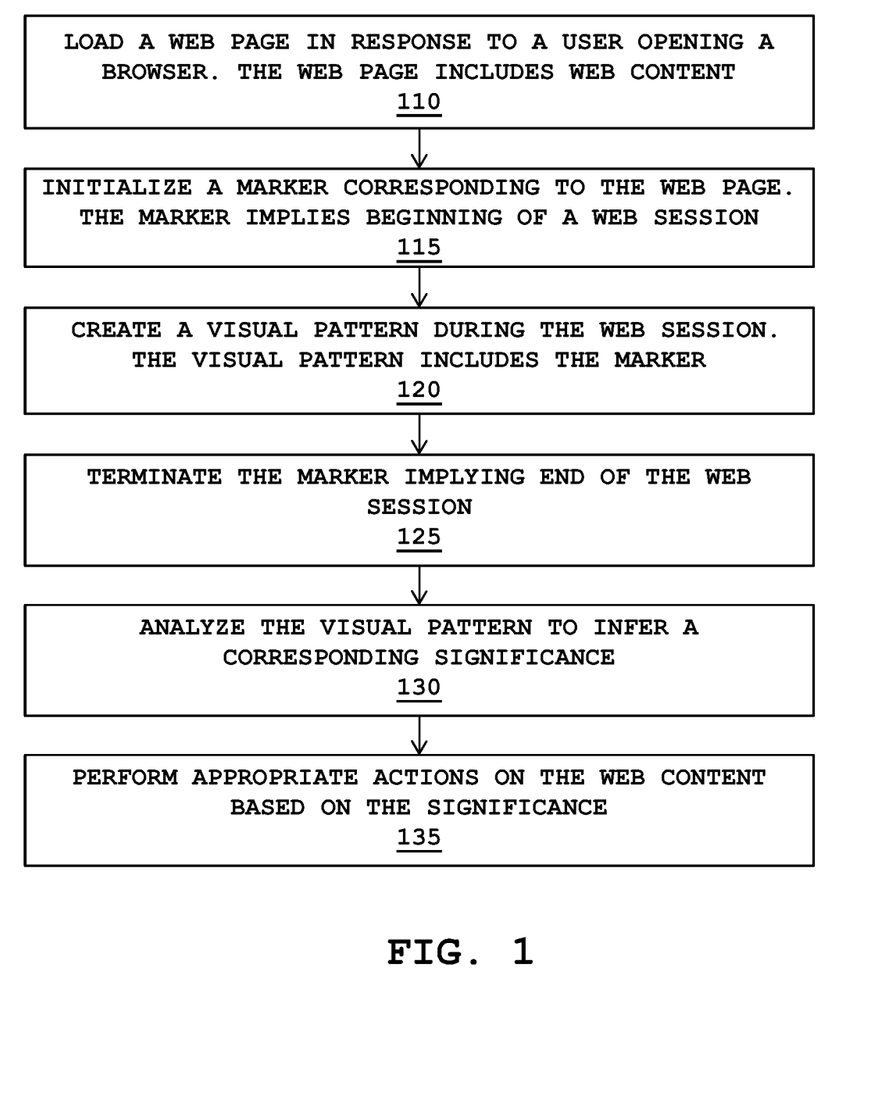
FIG. 1 is a flow diagram illustrating a method of visualizing patterns during internet browsing, in accordance with one embodiment.

FIG. 1 is a flow diagram illustrating a method of visualizing patterns during internet browsing, in accordance with one embodiment.

At step 110, a web page is loaded in response to a user opening a web browser. The web page includes web content.

The user often views and interacts with information on the World Wide Web. The information is provided by the web browser. The web browser can be a desktop web browser (for example, Internet Explorer, Firefox, Mozilla, or Chrome), a mobile browser, or a web viewer built into an application program. Once the user opens the web browser, the web page is loaded. The web page is a hypertext document on the World Wide Web including content, for example text, images, video, advertisements and audio. Alternatively, the user can key in a Universal Resource Locator (URL) of a desired website. The website is a set of related web pages.

In some embodiments, the web pages can be viewed from Internet-enabled devices, for example desktop computers, laptops, PDAs and cell phones.

At step 115, a marker corresponding to the web page is initialized. The marker implies beginning of a web session.

The marker is illustrated as a horizontal rectangular box drawn to the length of the web page. In some embodiments, the marker can take dimensions of any other suitable shape.

The web session is initiated by the web browser when the user visits the web page for a first time. The web session defines the time spent by the user on one or more web pages.

At step 120, a visual pattern is created during the web session. The visual pattern includes the marker.

The journey of the user during the web session is captured as a visual pattern. The visual pattern is created by detecting activities performed by the user during the web session. Examples of the activities include, but are not limited to, scrolling movements across the web page, interactions with the web content, reading articles on the web page and quitting a current web page. Further, the activities are illustrated on the marker to form the visual pattern. Consequently, the visual pattern depicts the user journey during the web session and utilization of the web content.

The visual pattern is continuous data streams of the user movements on the web page. Further, the visual pattern includes a base pattern of the user along with an anomalous pattern. The base pattern is a standard, expected behavior pattern of multiple users, observed over a period of time. For example, activities and interactions with the web content of a hundred users are observed over a period of thirty days. Moreover, the base patterns are classified by various consumers based on context of the consumers. The anomalous pattern is an irregular pattern of the user observed while browsing the web page.

As the user scrolls down the web page, the marker begins to get filled.

Consequently, the visual patterns would help consumers, for example, editors, designers and advertisers. The editors can increase content experience for users. Similarly, the designers can improve design and thereby increase user experience. Further, the advertisers can improve placement of advertisements, monetization and conversion.

At step 125, the marker is terminated implying end of the web session.

The end of the web session is identified when the user quits the web page. At this point, the marker is terminated.

A summary of the web session is generated. The summary includes details of length of the web page scrolled by the user, number of web pages visited and the web page where the web session ended.

At step 130, the visual pattern is analyzed to infer a corresponding significance factor.

The significance factor is a unique meaning given to the visual pattern. Examples of the significance factor includes, but is not limited to, flipping through the web content, reading the web content and interacting with the web content.

The visual pattern is compared with a corresponding base pattern. Consequently, a deviation parameter from the base pattern is derived. The deviation parameter signifies a corresponding meaning of the visual pattern.

Further, the visual pattern is stored in a database for future reference. Over a period of time, the visual patterns are all gathered to form a library.

At step 135, appropriate actions are performed on the web content based on the significance factor.

Various consumers are notified to perform the appropriate actions. Examples of the consumers and corresponding actions to be performed includes, but is not limited to as listed below:

1. Editors:
   a. Personalization effectiveness validation: The visual pattern can be used to validate accuracy of the user's personal interest. For example, assume a user's interests are Interest A and Interest B. However, the visual pattern reveals that the user does not spend considerable time to utilize content pertaining to Interest A and Interest B. The user is more inclined to content of Interest C.
   b. Declaration of Interest: If the deviation parameter from the base pattern is significant, the interests declared by the user needs to be reviewed.
   c. Content quality and engagement: The visual pattern can be used to evaluate content quality and engagement. For example, a scattered content utilization shown in the visual pattern implies that the user engagement needs to be enhanced. Similarly, a glimpse through the web content in the visual pattern implies that the user engagement is very low. Further, when content utilization appears only at the top of the web page, content further down the web page needs to be improved or altered. When back and forth movements are observed in the visual pattern over two pieces of web content, corresponding articles in the web content needs to be evaluated.

2. Advertisers:
   a. Dynamic-contextual promotion: Based on the visual patterns, relevant product promotion content can be presented to the users. For example, promotional advertisements are presented to the user at points of scroll where the user spends extra time. In another example, articles and content of interest to the users are presented at weak points in the visual pattern wherein the user spends less time.
   b. AD placement evaluation: The visual patterns observed over a group of users help the advertisers to pick the best spot for AD placement.

3. Designers:
   a. Exit Pattern Identification: A common visual pattern of exit helps to design solutions and ideas to make the user to navigate to other content of interest. For example, when the user reaches a point of exit, a prompt can be presented to the users with a link to an article of interest. As a result, a means of avoiding the user going out of the publisher context can be achieved.

Figure 2:
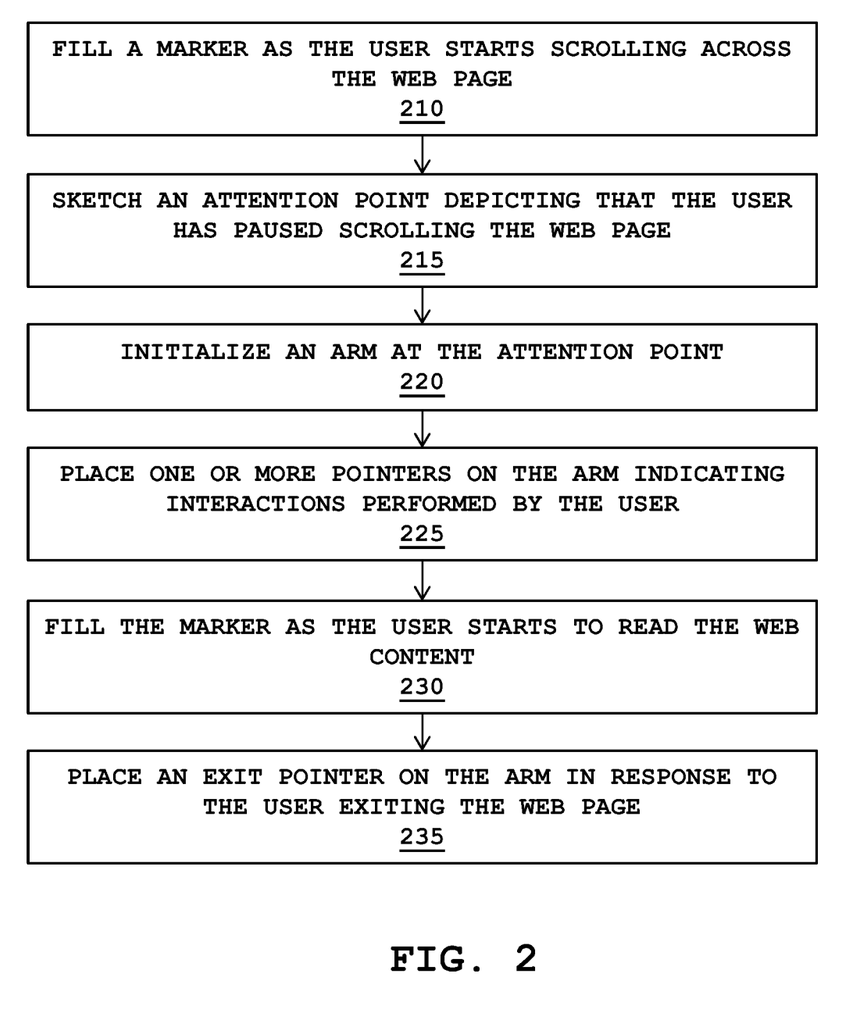
FIG. 2 is a flow diagram illustrating a method for creating a visual pattern, in accordance with one embodiment.

FIG. 2 is a flow diagram illustrating a method for creating a visual pattern, in accordance with one embodiment.

At step 210, a marker is filled as the user starts scrolling across the web page.

The marker obtains the length of the web page. However, the marker gets filled as the user starts to scroll down the web page.

At step 215, an attention point is sketched depicting that the user has paused scrolling the web page.

As the user continues to scroll, the user comes across an article of interest. At this point of time, the user pauses scrolling to read the article. Consequently, an attention point is sketched on the marker.

Multiple attention points are placed on the marker at various depths of page scroll.

At step 220, a block is initialized at the attention point.

As the user spends more time at the attention point, the block is initialized at the attention point. In one embodiment, the block is a vertical block. The block indicates that the user is reading articles at that specific attention point.

At step 225, one or more pointers are placed on the block indicating interactions performed by the user.

The user can interact with articles on the web page. For example, the user can click to view an advertisement. The interactions performed by the user are indicated by pointers on the block.

At step 230, the marker is filled as the user starts to read the web content.

The marker is filled as the user begins to scroll down the web page.

The process of initializing the block and placing pointers on the block continues as the user resumes scrolling down the web page.

At step 235, an exit pointer is placed on the block in response to the user quitting the web page.

At the point when the user desires to quit the web page, the exit pointer is placed on the block.

Figure 3:
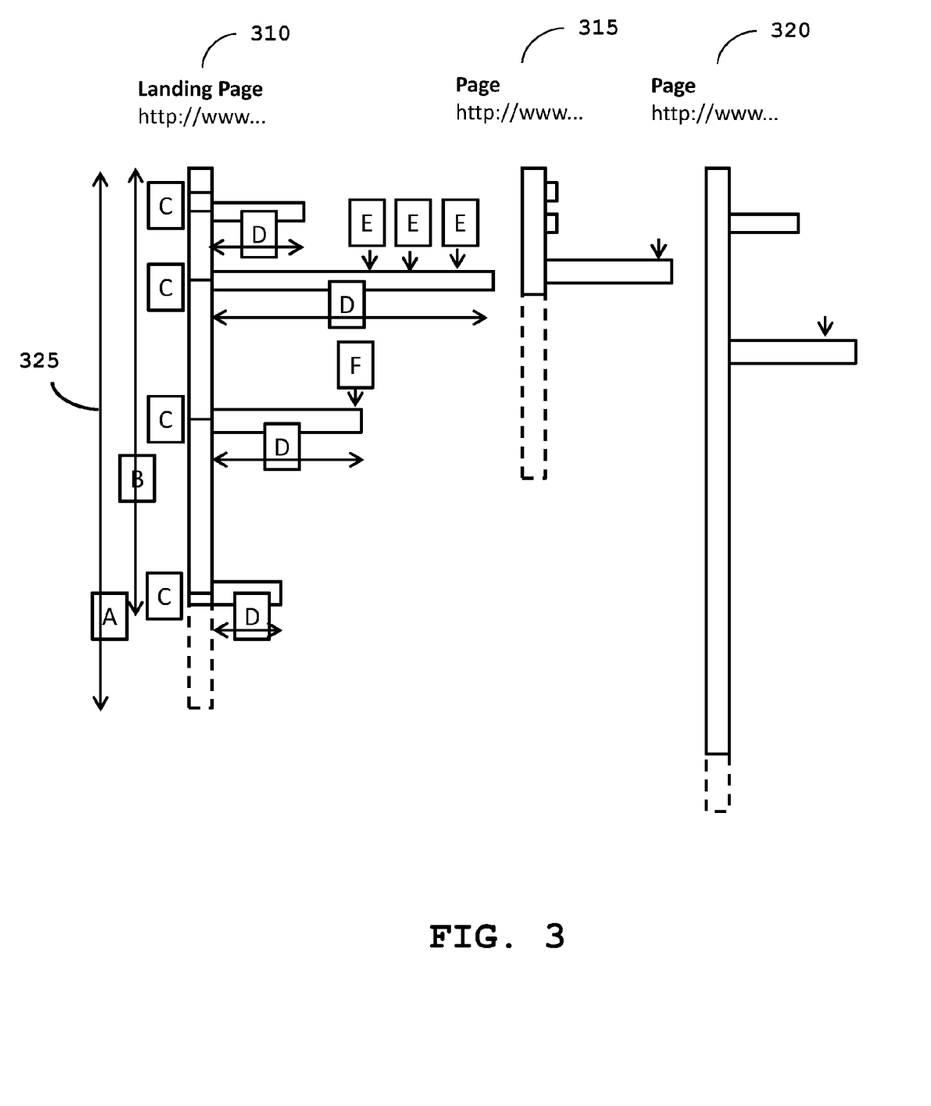
FIG. 3 is an exemplary representation of user journey at different points of page scroll during a web session, in accordance with one embodiment.

FIG. 3 is an exemplary representation of a user journey at different points of page scroll during a web session, in accordance with one embodiment.

The user journey during a web session begins by loading a first web page referred to as a landing page 310. The user visits subsequent pages referred to as page 315 and page 320 during the web session.

The following explains the various abbreviations and details of the user journey:

A: denotes the proportional page length. The marker 325 is initialized corresponding to the page length.
B: denotes the total page length traveled by the user. Further, a dotted line on the marker depicts the portion of the web page that was not visited by the user.
C: denotes the attention point where the user pauses scrolling at various depths of page scroll.
D: denotes the proportional time spent at the attention point. At every attention point, a vertical block is initialized to denote the time spent by the user.
E: denotes the pointers indicating the interactions during the course of D (time spent at the attention point). The user interacts with the web content at this point.
F: denotes the point wherein the user decides to exit the web page 310. The user visits subsequent pages, page 320 and page 325.

The user journey on page 315 and page 320 follow the same abbreviations as described above.

FIG. 4a, FIG. 4b, FIG. 4c, FIG. 4d, and FIG. 4e is a step-by-step illustration of creating a visual pattern, in accordance with one embodiment.

Figure 4A:
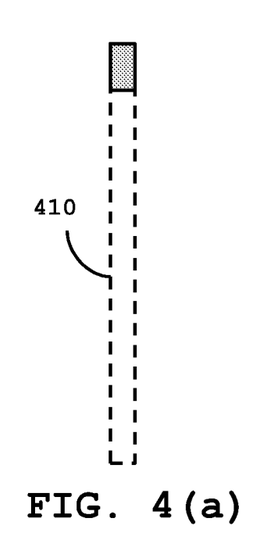
FIGS. 4a-4e is a step-by-step illustration of creating a visual pattern, in accordance with one embodiment.

FIG. 4a represents a marker 410 as a web page is loaded in the browser. The marker takes up the length of the web page.

Figure 4B:
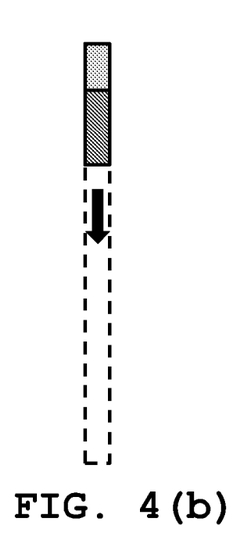

FIG. 4b illustrates the marker 410 getting filled as the user scrolls down the web page.

Figure 4C:
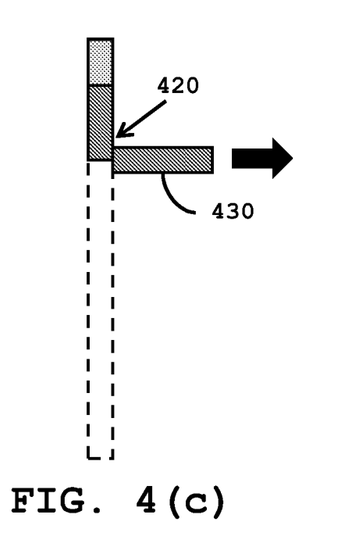

FIG. 4c illustrates an attention point 420 as the user stops scrolling the web page. The user spends more time at this position of the web page. Consequently, a block 430, horizontal in shape is drawn until the user starts to scroll again.

Figure 4D:
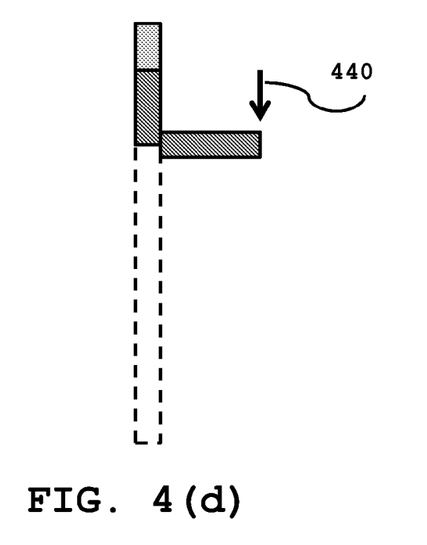

FIG. 4d illustrates one or more pointer 440. The pointer 440 depicts that the user has interacted with the web content at that specific point on the web page.

Figure 4E:
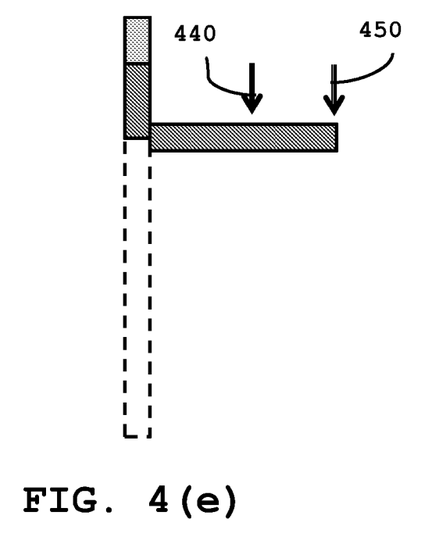

FIG. 4e illustrates an exit pointer 450 as the user decides to quit the web page. The exit pointer 450 is placed on the block 430.

The above process continues as the user browses through the web session.

FIG. 5a, FIG. 5b, FIG. 5c and FIG. 5d are exemplary representations of visual patterns and deviation parameters from the base patterns, in accordance with one embodiment.

The base pattern illustrates an expected pattern of consumption of web content. The base pattern is observed over a period of time for a predefined number of users, for example hundred users. Further, the visual pattern illustrates a pattern created by a user during a web session.

Figure 5A:
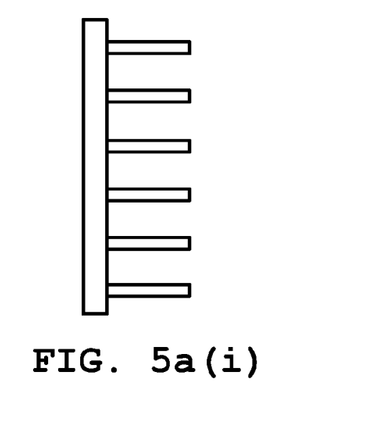
FIG. 5a, FIG. 5b, FIG. 5c and FIG. 5d are exemplary representations of visual patterns and deviation parameters from base patterns, in accordance with one embodiment.
Figure 5B:
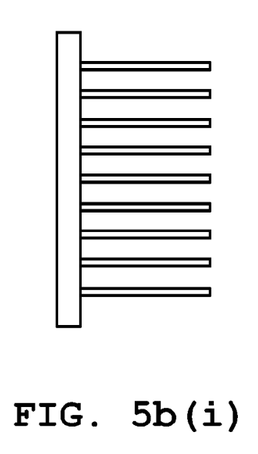
Figure 5C:
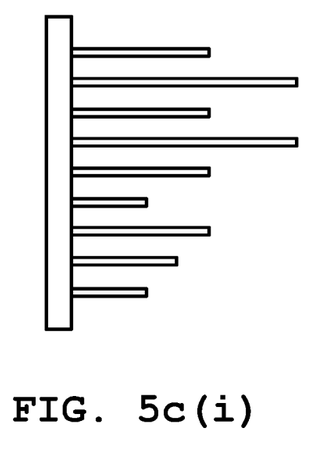
Figure 5D:
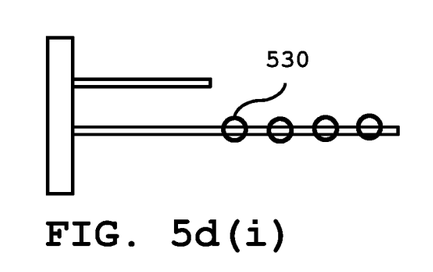

FIG. 5a (i) represent a base pattern when the user flips through articles in the web content.

FIG. 5a (ii) represents a visual pattern with a deviation parameter from FIG. 5a (i). The deviation parameter notifies that at 510 the user found the articles interesting and spent considerable time reading the articles.

As a result, user preferences can be understood and can be further used for targeting appropriate advertisements and web content to the user.

FIG. 5b (i) represent a base pattern when the user reads through the articles.

FIG. 5b (ii) illustrates that the user is losing interest in the article 515 that is being read.

FIG. 5b (iii) illustrates that the user is getting interested in the article 520 and reads on.

As a result, the above pattern can notify an editor to the places where modifications can help avoid an early dropout by the user.

FIG. 5c (i) represents a base pattern when the user reads seriously through the articles FIG. 5c (ii) illustrates that the user scrolled back up to 525 to understand a specific article.

As a result, the above pattern can notify the editor and designer to fine tune the web content to avoid scrolling back and forth.

FIG. 5d (i) represents a base pattern when the user is engaged with interactions 530 with articles on the web page (interactive content).

FIG. 5d (ii) illustrates that the interactions are not clear to the user and hence exits from the web page. The exit pointer 535 depicts the point where the user exits.

FIG. 5d (iii) illustrates that the interactions 540 are clear yet the user is not engaging as the content is not engaging enough.

As a result, the above visual pattern can help make interactions clear.

Figure 6:
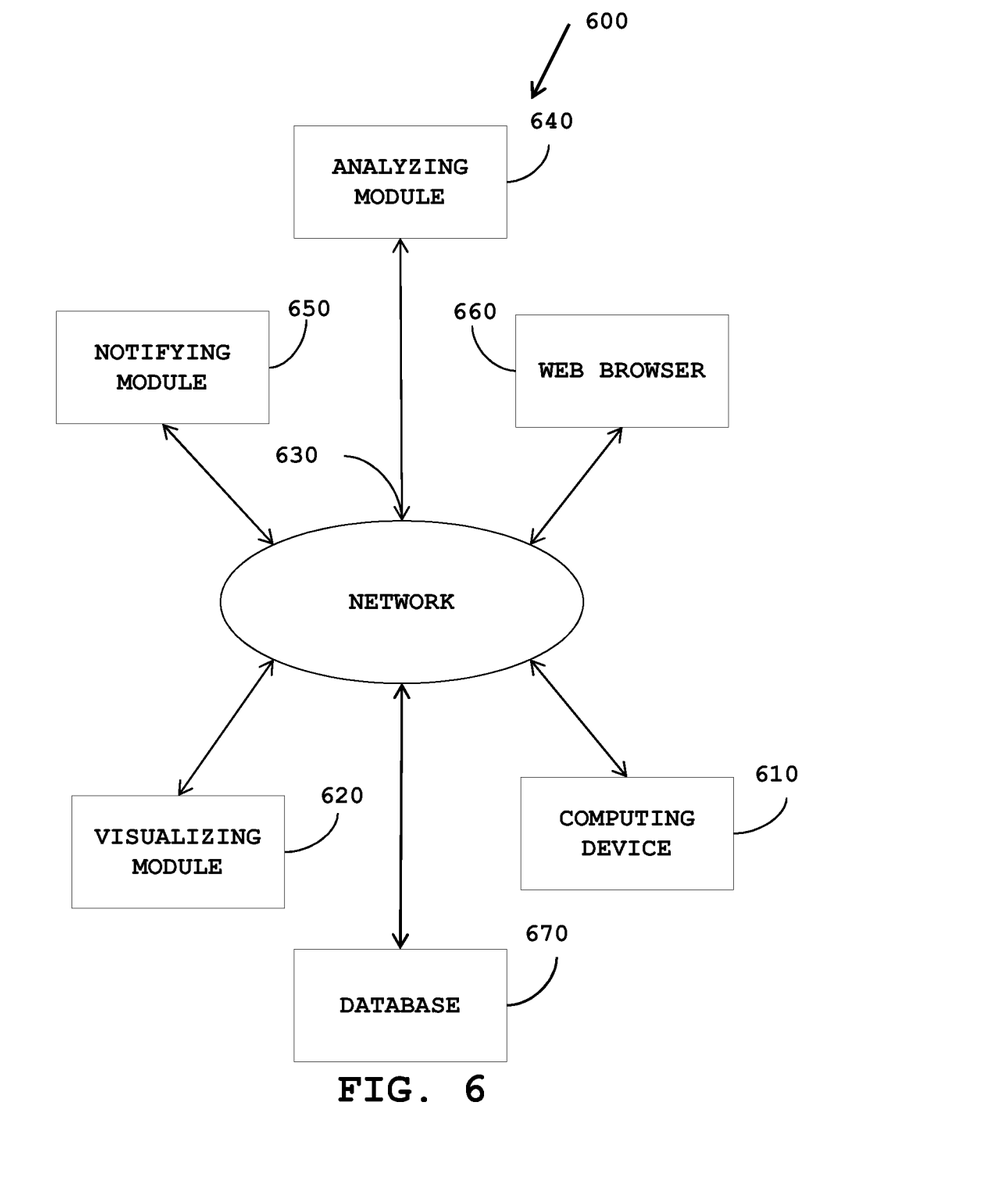
FIG. 6 is a block diagram illustrating a system for visualizing patterns during internet browsing, in accordance with one embodiment.

FIG. 6 is a block diagram illustrating a system for visualizing patterns during a web session, in accordance with one embodiment.

The system 600 can implement the method described above. The system 600 includes a computing device 610, a visualizing module 620, an analyzing module 640, a notifying module 650, a web browser 660 and a database 670 in communication with a network 630 (for example, the Internet or a cellular network).

Examples of the computing device 610 include, but are not limited to, a Personal Computer (PC), a stationary computing device, a laptop or notebook computer, a tablet computer, a smart phone or a Personal Digital Assistant (PDA), a smart appliance, a video gaming console, an internet television, or other suitable processor-based devices. In one embodiment, the web browser 660 loads a web page to a user of the computing device 610. As the user starts to scroll down the web page, a web session is initiated. Simultaneously, a visual pattern is captured by the visualizing module 620. The visual pattern captures the journey of the user and the user activities during the web session. Consequently, the user behavior and utilization of web content on the web page can be analyzed by the analyzing module 640. The notifying module 650 notifies various consumers, for example editors, designers and advertisers to take appropriate actions to improve web content experience for subsequent users. In some embodiments, the actions are performed on the fly such that the user is satisfied with the web content. Additional embodiments of the computing device 610 are described in detail in conjunction with FIG. 7.

The database 670 stores the visual patterns captured. The visual patterns also include base patterns that can be defined as expected patterns of multiple users over a period of time.

In one embodiment, the user of the computing device 610 desires to browse a specific web page from a web site. The computing device 610 displays a web page loaded by the web browser 660 through the network 630. A marker equal to the length of the web page is initialized. The user starts to utilize the content on the web page by scrolling down. At this point, the marker gets filled simultaneously depicting the user journey. Various activities of the user, for example, interactions with the web content and scrolling movements across the web page, are captured as a visual pattern by the visualizing module 620. A base pattern is retrieved from the database 670. The visual pattern and the base pattern are analyzed by the analyzing module 640. Subsequent to the analyzing, a significance factor of the visual pattern is inferred. Henceforth, the user behavior and utilization of the web content can be interpreted. Various consumers are notified by the notifying module 650 to ensure that appropriate actions are taken based on the significance factor. As a result, relevant product promotion content can be presented to the user and subsequent users.

Figure 7:
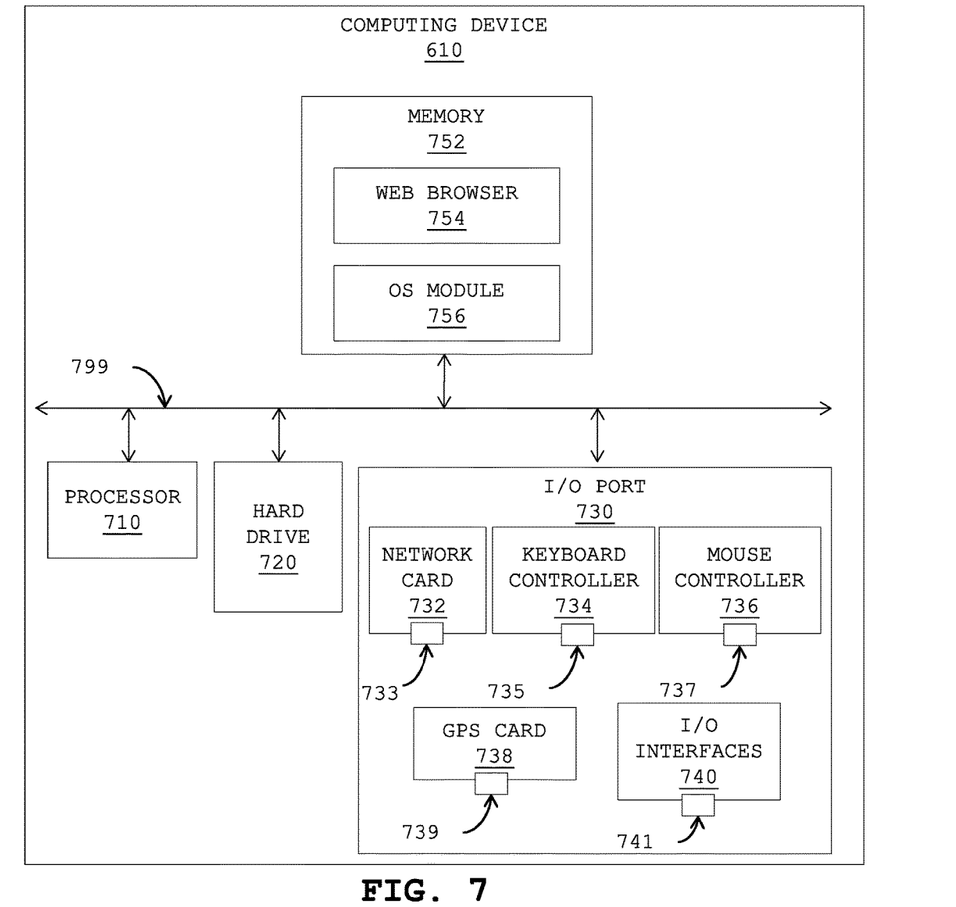
FIG. 7 is a block diagram illustrating an exemplary computing device, in accordance with one embodiment.

FIG. 7 is a block diagram illustrating an exemplary computing device, for example the computing device 610 in accordance with one embodiment. The computing device 610 includes a processor 710, a hard drive 720, an I/O port 730, and a memory 752, coupled by a bus 799.

The bus 799 can be soldered to one or more motherboards. Examples of the processor 710 includes, but is not limited to, a general purpose processor, an application-specific integrated circuit (ASIC), an FPGA (Field Programmable Gate Array), a RISC (Reduced Instruction Set Controller) processor, or an integrated circuit. The processor 710 can be a single core or a multiple core processor. In one embodiment, the processor 710 is specially suited for processing demands of location-aware reminders (for example, custom micro-code, and instruction fetching, pipelining or cache sizes). The processor 710 can be disposed on silicon or any other suitable material. In operation, the processor 710 can receive and execute instructions and data stored in the memory 752 or the hard drive 720. The hard drive 720 can be a platter-based storage device, a flash drive, an external drive, a persistent memory device, or other types of memory.

The hard drive 720 provides persistent (long term) storage for instructions and data. The I/O port 730 is an input/output panel including a network card 732 with an interface 733 along with a keyboard controller 734, a mouse controller 736, a GPS card 738 and I/O interfaces 740. The network card 732 can be, for example, a wired networking card (for example, a USB card, or an IEEE 802.3 card), a wireless networking card (for example, an IEEE 802.11 card, or a Bluetooth card), and a cellular networking card (for example, a 3G card). The interface 733 is configured according to networking compatibility. For example, a wired networking card includes a physical port to plug in a cord, and a wireless networking card includes an antennae. The network card 732 provides access to a communication channel on a network. The keyboard controller 734 can be coupled to a physical port 735 (for example PS/2 or USB port) for connecting a keyboard. The keyboard can be a standard alphanumeric keyboard with 101 or 104 keys (including, but not limited to, alphabetic, numerical and punctuation keys, a space bar, modifier keys), a laptop or notebook keyboard, a thumb-sized keyboard, a virtual keyboard, or the like. The mouse controller 736 can also be coupled to a physical port 737 (for example, mouse or USB port). The GPS card 738 provides communication to GPS satellites operating in space to receive location data. An antenna 739 provides radio communications (or alternatively, a data port can receive location information from a peripheral device). The I/O interfaces 740 are web interfaces and are coupled to a physical port 741.

The memory 752 can be a RAM (Random Access Memory), a flash memory, a non-persistent memory device, or other devices capable of storing program instructions being executed. The memory 752 comprises an Operating System (OS) module 756 along with a web browser 754. In other embodiments, the memory 752 comprises a calendar application that manages a plurality of appointments. The OS module 756 can be one of Microsoft Windows® family of operating systems (for example, Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

The web browser 754 can be a desktop web browser (for example, Internet Explorer, Mozilla, or Chrome), a mobile browser, or a web viewer built integrated into an application program. In an embodiment, a user accesses a system on the World Wide Web (WWW) through a network such as the Internet. The web browser 754 is used to download the web pages or other content in various formats including HTML, XML, text, PDF, and postscript, and may be used to upload information to other parts of the system. The web browser may use URLs (Uniform Resource Locators) to identify resources on the web and HTTP (Hypertext Transfer Protocol) in transferring files to the web.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 802.11n). In one example, signals from the computer can be transferred, at least in part, wirelessly to components or other computers.

Advantageously, capturing visual patterns help in identifying points of concern and interest of the user. Consequently, business decisions can be taken. Further, by capturing visual patterns, behavior patterns of the user are obtained.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A computer-implemented method, the computer-implemented method comprising:
   causing, by at least one processor, a web page to be loaded in response to receiving input indicative of a user opening a browser;
   initializing, by the at least one processor, a visual pattern including a marker corresponding to the web page, initialization of the marker corresponding to a beginning of a web session;
   modifying, by the at least one processor, the visual pattern during the web session in response to multiple different detected activities of the user with the web page during the web session, the modifying comprising modifying the visual pattern by filling in the marker in response to receiving input indicative of the user scrolling the web page, and to include one or more attention points, which indicate locations corresponding to scrolling pause within the web page, and one or more blocks having a length, where the length of the one or more blocks corresponding to an amount of time in connection with the scrolling pause, as different visual indicators corresponding to the multiple different detected activities of the user with the web page during the web session;
   terminating, by the at least one processor, the modifying of the visual pattern in response to input indicative of the user ending the web session;
   presenting, by the at least one processor, the visual pattern to a consumer;
   analyzing, by the at least one processor, the visual pattern, the analyzing comprising comparing the visual pattern comprising the different visual indicators indicative of the multiple different detected activities of the user during the web session to a base visual pattern comprising multiple different expected behavior pattern indicators indicative of an expected behavior pattern to determine whether the visual pattern deviates from the base pattern to determine a significance factor characterizing the web session of the user; and
   providing, by the at least one processor, a notification of at least one action to perform relative to the web content based on the significance factor.

2. The computer-implemented method of claim 1, the multiple different activities capable of being detected comprising a scrolling movement that if detected causes the visual pattern to be modified to include a scrolling visual indicator comprising a fill in of the marker, a pause in scrolling that if detected causes the visual pattern to be modified to include a pause visual indicator having a length indicating a pause time, a selection of content of the web page that if detected causes the visual pattern to be modified to include a content selection visual indicator indicating a point relative to a pause visual indicator in the visual pattern, and a web page exit that if detected causes the visual pattern to be modified to include a web page exit visual indicator comprising a pointer to be added to the visual pattern.

3. The computer-implemented method of claim 2, the modifying further comprising:
   receiving input indicative of user activity anywhere on the web page.

4. The computer-implemented method of claim 1, the visual pattern represents a user's utilization of the web content during the web session.

5. The computer-implemented method of claim 1, modifying the visual pattern further comprising:
  using one or more pointers as the different visual indicators of the user's web page content selection and placing the one or more pointers in the visual pattern relative to the one or more blocks, each pointer is indicative of the user's selection of web page content; and
  using an exit pointer as the corresponding visual indicator of a web page exit and placing the exit pointer in the visual pattern in response to receiving input indicative of the user quitting the web page.

6. The computer-implemented method of claim 1, further comprising generating, by the at least one processor, a summary of the web session.

7. The computer-implemented method of claim 1, analyzing the visual pattern further comprising:
  deriving a deviation parameter based on the comparing of the visual pattern and the base visual pattern; and
  learning the significance factor using the deviation parameter.

8. The computer-implemented method of claim 1, further comprising:
  storing, by the at least one processor, the visual pattern; and
  creating, by the at least one processor, a library of visual patterns previously generated.

9. A computer readable non-transitory storage medium for tangibly storing thereon computer readable instructions that when executed cause at least one processor to:
  cause a web page to be loaded in response to receiving input indicative of a user opening a browser;
  initialize a visual pattern including a marker corresponding to the web page, initialization of the marker corresponding to a beginning of a web session;
  modify the visual pattern during the web session, in response to multiple different detected activities of the user with the web page during the web session, the modifying comprising modifying the visual pattern by filling in the marker in response to receiving input indicative of the user scrolling the web page, and to include one or more attention points, which indicate of locations corresponding to scrolling pause within the web page, and one or more blocks having a length, where the length of the one or more blocks corresponding to an amount of time in connection with the scrolling pause, as different visual indicators corresponding to the multiple different detected activities of the user with the web page during the web session;
  terminate the modifying of the visual pattern in response to input indicative of the user ending the web session;
  present the visual pattern to a consumer;
  analyze the visual pattern, the analyzing comprising comparing the visual pattern comprising the different visual indicators indicative of the multiple different detected activities of the user during the web session to a base visual pattern comprising multiple different expected behavior pattern indicators indicative of an expected behavior pattern to determine whether the visual pattern deviates from the base pattern to determine a significance factor characterize the web session of the user; and
  providing a notification of at least one action to perform relative to the web content based on the significance factor.

10. The computer program product of claim 9, the multiple different activities capable of being detected comprising a scrolling movement that if detected causes the visual pattern to be modified to include a scrolling visual indicator comprising a fill in of the marker, a pause in scrolling that if detected causes the visual pattern to be modified to include a pause visual indicator having a length indicating a pause time, a selection of content of the web page that if detected causes the visual pattern to be modified to include a content selection visual indicator indicating a point relative to a pause visual indicator in the visual pattern, and a web page exit that if detected causes the visual pattern to be modified to include a web page exit visual indicator comprising a pointer to be added to the visual pattern.

11. The computer program product of claim 10, the instructions to modify further comprising instructions to:
  receive input indicative of user activity anywhere on the web page.

12. The computer program product of claim 9, the visual pattern represents a user's utilization of the web content during the web session.

13. The computer program product of claim 9, the instructions to modify the visual pattern further comprising instructions to:
  use one or more pointers as the different visual indicators of the user's web page content selection and place the one or more pointers in the visual pattern relative to the one or more blocks, each pointer is indicative of the user's selection of web page content; and
  use an exit pointer as the corresponding visual indicator of a web page exit and place an exit pointer on the block in response to receiving input indicative of the user quitting the web page.

14. The computer program product of claim 9, further comprising instructions to generate a summary of the web session.

15. The computer program product of claim 9, the instructions to analyze the visual pattern further comprising instructions to:
  derive a deviation parameter based on the comparing of the visual pattern and the base visual pattern; and
  learn the significance factor using the deviation parameter.

16. The computer-implemented method of claim 9, the instructions further comprising instructions to:
  store the visual pattern; and
  create a library of visual patterns previously generated.

17. A system comprising:
  a processor;
  a storage medium for tangibly storing thereon program logic for execution by the processor, the stored program logic comprising:
    causing logic executed by the processor for causing a web page to be loaded in response to receiving input indicative of a user opening a browser;
    initializing logic executed by the processor for initializing a visual pattern including a marker corresponding to the web page, initialization of the marker corresponding to a beginning of a web session;
    modifying logic executed by the processor for modifying the visual pattern during the web session in response to multiple different detected activities of the user with the web page during the web session, the modifying comprising modifying the visual pattern by filling in the marker in response to receiving input indicative of the user scrolling the web page, and to include one or more attention points, which indicate locations corresponding to scrolling pause within the web page, and one or more blocks having a length, where the length of the one or more blocks corresponding to an amount of time in connection with the scrolling pause, as different visual indicators corresponding to the multiple different detected activities of the user with the web page during the web session;

terminating logic executed by the processor for terminating the modifying of the visual pattern in response to input indicative of the user ending the web session;

presenting logic executed by the processor for presenting the visual pattern to a consumer;

analyzing logic executed by the processor for analyzing the visual pattern, the analyzing comprising comparing the visual pattern comprising the different visual indicators indicative of the multiple different detected activities of the user during the web session to a base visual pattern comprising multiple different expected behavior pattern indicators indicative of an expected behavior pattern to determine whether the visual patter deviates from the base pattern to determine a significance factor characterizing the web session of the user; and providing logic executed by the processor for providing a notification of at least one action to perform relative to the web content based on the significance factor.

18. The system of claim 17, the multiple different activities capable of being detected comprising a scrolling movement that if detected causes the visual pattern to be modified to include a scrolling visual indicator comprising a fill in of the marker, a pause in scrolling that if detected causes the visual pattern to be modified to include a pause visual indicator having a length indicating a pause time, a selection of content of the web page that if detected causes the visual pattern to be modified to include a content selection visual indicator indicating a point relative to a pause visual indicator in the visual pattern, and a web page exit that if detected causes the visual pattern to be modified to include a web page exit visual indicator comprising a pointer to be added to the visual pattern.

19. The system of claim 17, the analyzing logic executed by the processor further comprising:

deriving logic executed by the processor for deriving a deviation parameter based on the comparing of the visual pattern and the base visual pattern; and learning logic executed by the processor for learning the significance factor using the deviation parameter.

* * * * *